US011904717B2

(12) United States Patent
Langton et al.

(10) Patent No.: US 11,904,717 B2
(45) Date of Patent: Feb. 20, 2024

(54) INTELLIGENT PRECONDITIONING FOR HIGH VOLTAGE ELECTRIC VEHICLE BATTERIES

(71) Applicant: Bayerische Motoren Werke Aktiengesellschaft, Munich (DE)

(72) Inventors: Adam Langton, San Francisco, CA (US); Henry Pease, San Francisco, CA (US); Anderson Vankayala, Mountain View, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 623 days.

(21) Appl. No.: 17/122,471

(22) Filed: Dec. 15, 2020

(65) Prior Publication Data

US 2022/0185135 A1 Jun. 16, 2022

(51) Int. Cl.
*B60L 58/12* (2019.01)
*B60L 53/60* (2019.01)
*B60L 58/10* (2019.01)

(52) U.S. Cl.
CPC ............... *B60L 53/60* (2019.02); *B60L 58/10* (2019.02); *B60L 2240/60* (2013.01)

(58) Field of Classification Search
CPC ....... B60L 53/60; B60L 58/10; B60L 2240/60
See application file for complete search history.

(56) References Cited

U.S. PATENT DOCUMENTS

2016/0288659 A1* 10/2016 Hammoud ............. B60L 58/24
2019/0205842 A1*  7/2019 Starns ................... G05D 1/0088
2020/0055406 A1*  2/2020 Vallender .............. B60L 58/12
2020/0175782 A1   6/2020 Tokman et al.
2021/0284040 A1*  9/2021 Grunkemeyer ..... H02J 7/00034
2021/0376619 A1* 12/2021 Dai ....................... H02J 7/0049

FOREIGN PATENT DOCUMENTS

JP 2020-13726 A 1/2020

OTHER PUBLICATIONS

International Search Report (PCT/ISA/210) issued in PCT Application No. PCT/EP2021/068117 dated Oct. 14, 2021 (two (2) pages).

* cited by examiner

Primary Examiner — Dalena Tran
(74) Attorney, Agent, or Firm — Crowell & Moring LLP

(57) ABSTRACT

A system preconditions a battery pack of a vehicle to support fast charging. The system detects a trigger that that indicates the vehicle will be traveling or the battery pack of the vehicle has been reduced to a predetermined capacity. The system collects a plurality of samples of location data of the vehicle. The system predicts a destination of the vehicle based on the samples. The system determines a propensity of a user to charge the vehicle based on previous charging behavior of the user. The system determines a confidence score of the predicted destination and the determined propensity. The system determines whether to schedule preconditioning of the battery pack based on the confidence score meeting a threshold.

20 Claims, 5 Drawing Sheets

INTELLIGENT PRECONDITIONING FOR HIGH VOLTAGE ELECTRIC VEHICLE BATTERIES

BACKGROUND

During driving operation, electric vehicles (EVs) may be principally powered by a battery pack having a plurality of batteries, which each include a plurality of battery cells. As power is consumed by the various systems, such as the propulsion, climate control, and entertainment systems, for example, the power capacity of the battery pack may be reduced. The travel range of the EV, which has historically been a key performance metric, is based in part on the battery pack power capacity. At some point, the user may elect to recharge the EV battery pack, thereby restoring its capacity to deliver power and range. Restoring the capacity of the battery pack more quickly means that the EV user may sooner resume operating the EV.

The goal of reducing the recharging time has led to the relatively recent boom in fast charging-capable infrastructure. Many contemporary EVs may be capable of fast charging at a minimum of 150 kW via techniques such as DC fast charging. For instance, most EVs announced in 2019 and later can charge to 80% of the associated battery pack capacity within 30 minutes using fast charging techniques. Charging at higher power levels may improve the convenience of the user experience by reducing the associated downtime of the EV.

BRIEF SUMMARY

According to an embodiment of the disclosed subject matter, a system may precondition a battery pack of a vehicle to support fast charging. The system may include a processor and a memory in communication with the processor. The memory may store a plurality of instructions executable by the processor to cause the system to detect a trigger that indicates the vehicle will be traveling or the battery pack of the vehicle has been reduced to a predetermined capacity. The memory may include instructions to cause the system to collect a plurality of samples of location data of the vehicle. The memory may further include instructions to cause the system to predict a destination of the vehicle based on the samples. The memory may further include instructions to cause the system to determine a propensity of a user to charge the vehicle based on previous charging behavior of the user. The memory may further include instructions to cause the system to determine a confidence score of the predicted destination and the determined propensity. The memory may further include instructions to cause the system to determine whether to schedule preconditioning of the battery pack based on the confidence score meeting a threshold. The memory may further include instructions to cause the system to determine whether a charging station exists at the predicted destination. The preconditioning of the battery pack of the vehicle may deliberately increases the temperature of the battery pack. The memory may further include instructions to cause the system to determine an estimated arrival time that the vehicle will arrive at the predicted destination and to determine a preconditioning time prior to the estimated arrival time when the vehicle should begin preconditioning the battery pack. The memory may further include instructions to cause the system to determine a time window needed to increase a temperature of the battery pack to a target preconditioned temperature. The memory may further include instructions to cause the system to compare the time window with an estimated arrival time that the vehicle will arrive at the predicted destination and start to precondition the battery pack based on the comparison. The system may determine whether a charging station exists at the predicted destination based on aggregate data published by a plurality of other vehicles that attempted to charge at the predicted destination. The instructions to cause the system to predict the destination of the vehicle may be based on a determination that no destination has been set in a navigation function of the vehicle. The memory may further include instructions to cause the system to cancel a scheduled or currently-executing preconditioning of the battery pack based on the confidence score not meeting a threshold. The propensity may be further based on at least one of the predicted location, a total distance driven on a day, a total distance driven since a last known charging event, whether other users or occupants are present in the vehicle, a price of recharging at a charging station of the predicted location, scheduled events and appointments stored within a personal computing device of the user, a predicted driver of the vehicle, a remaining state of charge of the battery pack, or whether amenities are available near a charging station of the predicted location.

According to an embodiment of the disclosed subject matter, a computer-implemented method may precondition a battery pack of a vehicle to support fast charging. The method may include detecting a trigger that indicates the vehicle will be traveling or the battery pack of the vehicle has been reduced to a predetermined capacity. The method may further include collecting a plurality of samples of location data of the vehicle. The method may further include predicting a destination of the vehicle based on the samples. The method may further include determining a propensity of a user to charge the vehicle based on previous charging behavior of the user. The method may further include determining a confidence score of the predicted destination and the determined propensity. The method may further include scheduling preconditioning of the battery pack based on the confidence score meeting a threshold. The method may further include determining whether a charging station exists at the predicted destination. The preconditioning of the battery pack of the vehicle may deliberately increase the temperature of the battery pack. The method may further include determining an estimated arrival time that the vehicle will arrive at the predicted destination and determining a preconditioning time prior to the estimated arrival time when the vehicle should begin preconditioning the battery pack. The method may further include determining a time window needed to increase a temperature of the battery pack to a target preconditioned temperature. The method may further include comparing the time window with an estimated arrival time that the vehicle will arrive at the predicted destination and starting to precondition the battery pack based on the comparison. The determining of whether a charging station exists at the predicted destination may be based on aggregate data published by a plurality of other vehicles that attempted to charge at the predicted destination. The predicting of the destination of the vehicle may be based on determining that no destination has been set in a navigation function of the vehicle. The method may further include canceling a scheduled or currently-executing preconditioning of the battery pack based on the confidence score not meeting a threshold. The propensity may be further based on at least one of the predicted location, a total distance driven on a day, a total distance driven since a last known charging event, whether other users or occupants are present in the vehicle, a price of recharging at a charging station of the predicted location, scheduled events and appointments stored within a personal computing device of the user, a predicted driver of the vehicle, a remaining state of charge of the battery pack, or whether amenities are available near a charging station of the predicted location.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
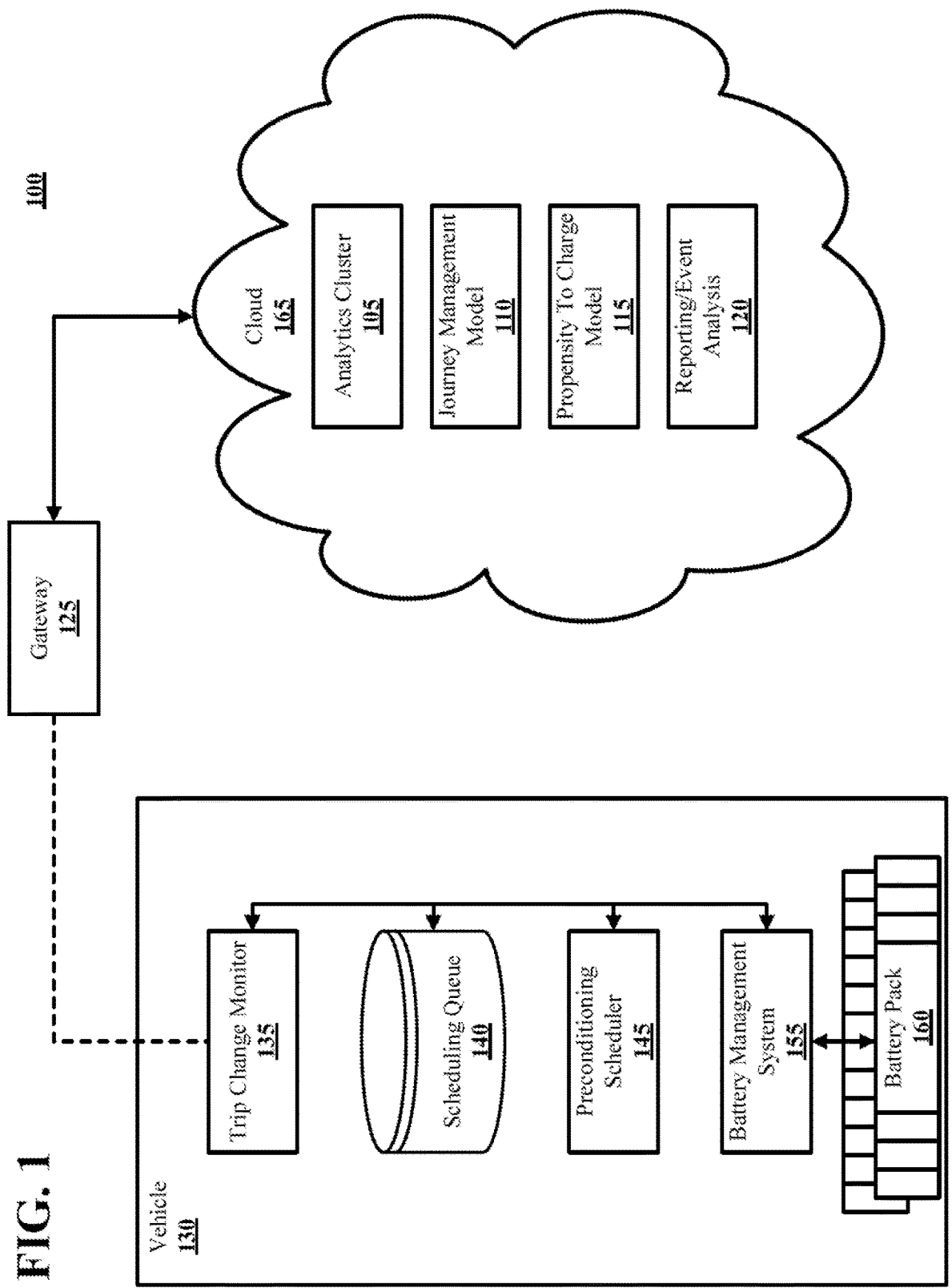
FIG. 1 shows an example system for predicting whether a vehicle should begin a battery pack preconditioning process in accordance with an embodiment of the present subject matter.

As used herein, the term "vehicle" shall refer to an electric vehicle, a hybrid vehicle, or any vehicle that utilizes a battery pack at least in-part for providing power to its propulsion system. A hybrid vehicle may utilize a battery pack in addition to an internal combustion engine or a hydrogen fuel cell to provide propulsion for the vehicle.

As used herein, the term "DC fast charging station" refers to a type of fast charging employing direct current (DC), although other types of fast charging may be employed without departing from the scope of the present subject matter, provided that those other types could be used with or would benefit from a vehicle preconditioning routine. To simplify the subsequent discussion, "DC fast charging" will be used as an example type of fast charging, although other types of fast charging may be applicable to the disclosed subject matter. Moreover, other types of charging, while not necessarily considered "fast," may be employed if such charging routines could be used with or would benefit from a vehicle preconditioning routine, whether applied to the battery pack of the vehicle or another vehicle component.

To DC fast charge an electric vehicle (EV) at high-power, such as 150 kW or more, it may be preferable for the vehicle battery pack to first complete a preconditioning routine. A preconditioning routine may include reducing the cooling and/or increasing a heat of the battery pack to deliberately increase the temperature of the associated batteries and battery cells. Reducing the cooling may be achieved by reducing or stopping a flow of coolant, refrigerant, air, and/or the like, any of which may be thermally coupled to the vehicle battery pack. Increasing the heating of the battery pack may mean to actively heating it via resistive heating techniques, liquid heating via coolant, refrigerant, or air, and/or operating the vehicle systems, such as one or more of the vehicle motors, in an inefficient manner to cause the battery pack to increase in temperature. Increasing the temperature of the battery pack may allow the associated battery cells to absorb energy more rapidly from the DC fast charging process without incurring damage, and/or may prolong the service life of the battery pack. Using the preconditioning process, the battery pack may become more fully charged during a given time window. Therefore, the preconditioning process may maximize or at least increase the range of the EV for the given time window when compared with DC fast charging without conducting a preconditioning process.

Difficulties with previous implementations of preconditioning may be in determining an appropriate "trigger" for the EV to begin preconditioning. Examples of triggers to begin the preconditioning routine may include variations of the methods defined below.

"On Navigation Resume." When a user sets the navigation destination of their EV explicitly to a DC fast-capable charging station using a Human Machine Interface (HMI), a trigger may be set to determine an appropriate time to begin preconditioning the battery pack prior to reaching the fast charging station. The HMI may be in the form of a vehicle touchscreen, keypad, microphone, video camera, gesture-recognition sensor, and the like, which facilitates conveying input from the user to a vehicle-based computing system. In this way, the battery pack may reach an increased threshold temperature by the time of arrival at the DC fast charging station. It is important to note that the navigation destination may be set via the HMI natively and not via a projected mode using a personal communication device, smart phone, tablet, laptop computer, or the like.

"On Departure Time." A trigger may be established when the vehicle computing system may be informed of the user's intent to depart at a specific time in the future while the vehicle may be connected to a power source, such as a charging adapter or charging station. The user may indicate this intention either via the HMI or using other methods, such as a software application executing on a smart phone, tablet, laptop computer, desktop computer, or the like. The period between the user's indication of his/her intent and the intended time of departure may determine whether fast charging should be expected to occur, and whether preconditioning should be scheduled. Based on the period length, the vehicle charging system may elect to fast charge for all, some, or not at all.

Both the "On Navigation Resume" and "On Departure Time" triggers may be unable to capture a vast number of situations where preconditioning could be anticipated to occur or should not occur, leaving the user with suboptimal results. The suboptimal results may be, for example, that the DC fast charging process requires additional time, and/or that the vehicle battery pack may be unnecessarily heated to high temperatures and not subsequently connected to a DC fast charging station. Raising the temperature of the battery pack unnecessarily because of incorrectly predicting that DC fast charging will occur may accelerate the deterioration of the battery pack over time, thereby reducing its lifetime, or even causing damage the battery pack. Accordingly, incorrect predictions about when to trigger the preconditioning process may be costly to the EV user both in terms of being inconvenienced by the additional downtime while recharging and in terms of premature replacement of the battery pack.

A computing system in accordance with the present subject matter may more accurately predict when a user intends to connect his/her EV to a DC fast charging station.

This prediction may be made early enough to complete a battery pack preconditioning routine prior to connecting with the DC fast charging station at a trip destination. Preconditioning the battery pack may maximize, or at least increase, the energy throughput during the DC fast charging process and reduce the amount of time needed to restore the battery capacity of the EV.

A journey management model may receive a given state and historic driving behavior data as inputs. A given state may include various parameters, such as a current state of charge (SoC) of the battery pack, a current driver of the vehicle, a current vehicle efficiency in terms of distance per kilowatt-hour, a model or type of vehicle, the date and time, calendar events, and the like. Based on one or more of these inputs, the journey management model may generate a list data structure, such as a tuple, for example, that includes one or more predicted destinations of where a user may be driving the EV. Each of the predicted destinations may be associated with a confidence score. The confidence score may indicate the probability or the magnitude of certainty with which the predicted destination may be expected to be correct. The journey management model may be generated using long short-term memory (LSTM) networks, deep learning techniques, neural network-based techniques, machine learning techniques, heuristic-based techniques, and the like.

An analytics cluster may receive a bounding box of geo-coordinates, a single geo-coordinate with a pre-defined radius, and/or equivalent data the defines a geographic region as inputs. Based on one or more of these inputs, the analytics cluster may generate a list of DC fast charging-capable stations by referring to a database, index, or other storage system and applying filtering techniques based at least on the geo-coordinate or geographic input data. The analytics cluster may be responsive to changes in the vehicle-charging infrastructure in real time. For instance, the analytics cluster may revise and/or regenerate its list of DC fast charging-capable stations based on received data that indicates charging stations have been relocated, shut down, revised to include new plug types, new charging capabilities, and/or to operate on a revised schedule. The data on which the analytics cluster operates may include fleet telemetry data collected from a plurality of vehicles and may operate using only the fleet telemetry data.

A user interface may allow a user of the EV to confirm and/or deny a predicted destination. The user interface may, for example, present the user with a specific predicted destination and prompt the user to confirm or deny his or her intention to drive the EV to the predicted destination. The prompt may be displayed to the user via the HMI, or forwarded to a personal communication device of the user, such as a smartphone, tablet, laptop, and the like. Alternatively, or in addition, the user interface may present the user with a more general inquiry, such as whether the user plans to fast charge the EV, and/or whether the user plans to visit a specific location.

A daemon may execute as a background process within the operating system environment of the computing system of the EV. The daemon may issue commands to a battery management system of the EV to begin preconditioning, to poll the temperature of the battery pack, and to poll the vehicle state. The vehicle state may be a subset of the state utilized in the context of the journey management model, as previously discussed, and include one or more of a current state of charge (SoC) of the battery pack, a current driver of the vehicle, a current vehicle efficiency in terms of distance per kilowatt-hour, the model or type of vehicle, the date and time, calendar events, and the like. The vehicle state, along with other attributes and predictors may be featured engineered to generate a payload for the journey management model. Either of the trip change monitor and preconditioning scheduler, which will be subsequently described, may be implemented as a daemon.

FIG. 1 illustrates a system 100 for predicting whether a vehicle should begin a battery pack preconditioning process in accordance with an embodiment of the present subject matter. The system 100 may include a cloud component 165 that may communicate with a gateway 125 via a network connection. The network connection may provide a direct connection that is wired or wireless. The network connection may be provided using any suitable physical interconnection and/or over-the-air modulation techniques and protocol as will be readily understood by one of skill in the art, including TCP/IP, digital cellular telephone, WiFi, Bluetooth®, near-field communication (NFC), and the like. Gateway 125 may further be in communication with one or more vehicles 130.

Cloud 165 may include an analytics cluster 105, a journey management model 110, a propensity to charge model 115, and a reporting/event analysis component 120. The analytics cluster 105 may include compute and storage resources that can perform processing and storage of data. The analytics cluster 105 may include, for example, NoSQL data storage structures having a real-time, up-to-the-second-accurate dataset of DC fast charging stations. The DC fast charging station dataset may be populated from various vehicle events and collected fleet vehicle telemetry data previously discussed. Data structures referred to as "chargeblocks" may be generated from the raw fleet vehicle telemetry data to capture when, where, and/or under what conditions participating vehicles are charging or have charged their respective battery packs. Table 1 below provides an overview of example data and/or metadata that may be stored in the analytics cluster 105 and associated with each DC fast charging station record.

TABLE 1

| Metadata Element | Data Type | Comment |
| --- | --- | --- |
| Predicted kW | Float16 | The max kW throughput at the station |
| Predicted Access Type | Enumeration | Public, Private, Restricted |
| Recently Used Vehicle Identifiers | Lis[GUID] | A list of vehicle identifiers that have charged at the station in the past n days |
| Last Used Time | Timestamp Time-zone Aware | The last known time when the station was used by a vehicle in the fleet |
| Predicted Num Ports | Int | Number of ports/outlets at the location |
| isHybrid | Bool | Returns true if the infrastructure here has both fast chargers and slow chargers |
| Longitude | Float32 | Location info |
| Latitude | Float32 | Location info |

The analytics cluster 105 may include microservices that iterate the real-time (currently-executing), historical charging sessions, and/or chargeblock data received by the gateway 125 through pre-existing data exchange mechanisms. The microservices may run miniaturized models that may predict and classify a charging station type using the metadata listed in Table 1. Consumption of the data in Table 1 may be performed with GraphQL-powered application programming interfaces (APIs) that may enable filtering the predicted DC fast charging stations with a parametrized radius, search location, geographic region, and/or the like. The metadata stored in the analytics cluster 105 as shown in Table 1 may be used to compare DC fast charging stations, to make recommendations to the user, to assess the availability or operating status of a station, and the like.

The journey management model 110 may include a cluster of compute resources, artificial intelligence (AI) models, and a wrapper. The AI models may be constructed from machine learning algorithms. Given one or more of n samples of location data of a live, ongoing trip, a trip start time, and/or a user identifier, the journey management model 110 may predict potential destinations and generate a confidence score. The potential destinations and confidence score may be generated and personalized based on the user of the EV that is driving, the user's trip history, and the user's charging patterns. The predicted potential destinations may be in the form of a list of destinations that the journey management model 110 predicts the user may be traveling to. The confidence score may be expressed as a likelihood or a probability that the predicted destination is correct. In an embodiment, the confidence score may be expressed as a value between 0 and 1. Each destination of the list of destinations generated by the journey management model 110 may be associated with a respective confidence score. The prediction generated by the journey management model 110 may be continually updated during a trip in real-time. During the trip, the journey management model 110 may receive driver behavior inputs and location data samples collected at regular, irregular, or at event-triggered intervals. This data may be used by the journey management model 110 to further refine the list of predicted destinations and improve the accuracy of the prediction as more data may be collected during the trip.

The journey management model 110 may persist, or otherwise store, the ground truth and ground truth events at the end of each trip to remain relevant, accurate, and adaptive to changes in the user's behavior. Some examples of ground truth that may be stored are the originally-predicted travel time, the actual travel time, whether the actual destination was entered as a change from a prior input destination, the SoC at the start and end of the trip, the kilowatt-hours used, the route distance, the waypoints that form the trip, and the like. The journey management model 110 may be retrained periodically based on the ground truth to further improve the accuracy of the journey management model 110. The ground truth may be objective, empirical data generated during the trip, as opposed to data that may be predictive, anticipatory, or determined by inference.

The journey management model 110 may distinguish the user who may be driving the EV from other users of the EV. Some users of the EV may be drivers while others are not. The driving and/or charging behavior of an EV driver may be influenced by the presence of another user in the EV who may not be a driver. For example, a driver may be found to be less likely to recharge the EV at a DC fast charging station when a child user may also be present. An EV may have several drivers because it may be shared within a household, a vehicle-sharing platform, a rental vehicle fleet, corporate vehicle fleet, and the like. Each driver may have distinct historical driving behavior, trip histories, and charging behavior. As in the prior example, users who are not of driving age may not be drivers but may still be considered users of the EV for other purposes. The journey management model 110 may determine a current driver of the EV from all the known users of the EV based on seating presets, a detected mass on a seating surface, Bluetooth® pairing data in the vehicle HMI, a key fob used to gain entry to the EV and/or to activate the EV, and other associated metadata. Identifying the driver and other users may play a key role in modeling the predicted destination, confidence score, and propensity to charge. The journey management model 110 may be incorporated within the EV system software using a wrapper that simplifies interfacing with the journey management model 110. The wrapper may match a predicted destination with a DC fast charging station and the user's propensity to charge based on previous charging behavior, including both previously DC fast charging behavior and previous charging behavior more generally, among other factors. As a result of the matching, the wrapper may output one or more charging station destinations, each associated with a confidence score.

The reporting/event analysis component 120 may be used to verify the effectiveness of the preconditioning processes disclosed in accordance with the present subject matter. The reporting/event analysis component 120 may provide critical engineering feedback that quantifies the efficacy of the system 100 in delivering accurate predictions of the vehicle destination, whether the vehicle will fast charge upon reaching the destination, and whether preconditioning should be scheduled.

The determination of a user's propensity to charge the vehicle 130 at a predicted destination may be based on a result generated by a propensity to charge model 115. The propensity to charge model 115 may be specific to each user of the vehicle 130 and may capture the user's propensity to utilize DC fast charging based on historical user data. For example, the propensity to charge model 115 may determine that the user has a propensity to DC fast charge the vehicle 130 when the state of the charge of the battery pack 160 falls within a defined range. The range may be, for example, less than 10% capacity of the battery pack 160 remaining. The propensity to charge model 115 may also evaluate other factors in predicting the user's likelihood of charging based on factors including, the total distance driven on a day, the total distance driven since the last known charging event, the day and time, whether other users or occupants are present in the EV, the current weather and/or temperature, the price of recharging at a particular charging station, the location of the charging station, scheduled events and appointments stored within a user's personal communication device, typical driving distance for a given day, a predicted driver, and whether particular amenities are available near a charging station, such as restrooms, food and beverages, shopping, and parks. In an example, the propensity to charge model 115 may utilize a user's historical travel and charging data to determine the likelihood that the user will fast charge upon arrival at a predicted and/or confirmed destination. The propensity to charge model 115 may be periodically retrained as more historical user data may be generated. In an embodiment, the propensity to charge model 115 may be implemented using a neural network with a long-short term memory (LSTM) or other machine learning algorithms.

The vehicle 130 may be an EV and powered by a battery pack 160, which may include one or more battery cells as previously described. The vehicle 130 may be provided with an operating system environment in which a variety of software may execute. In terms of the topology of the system 100, the vehicle 130 may be understood as an edge device. A trip change monitor 135 may execute a set of routines in response to various triggers. As previously discussed, these triggers may prompt the trip change monitor 135 to evaluate whether preconditioning of the vehicle battery pack 160 should be scheduled. For example, such triggers may include a navigation destination being set or changed using the vehicle HMI, a start of the trip where the driver begins driving, when the battery pack 160 is reduced to a predetermined SoC, and the like. The trip change monitor 135 may monitor driving and navigation patterns. The trip change monitor 135 may interface, directly or indirectly, with the cloud 165. Other components of vehicle 130 may interface with the cloud 165 using trip change monitor 135 as an intermediary or gateway. The trip change monitor 135 may collect real-time driving data and continually stream a current location of vehicle 130 at regular or irregular intervals to the journey management model 110 in the cloud 165. In addition to the current location, the trip change monitor 135 may also stream one of more past n samples of location data separately or in batches. The trip change monitor 135 may also schedule or cancel preconditioning of the vehicle 130 battery pack 160 by adding and/or removing requests to and from the scheduling queue 140. Other components of vehicle 130 may be "subscribed to" or otherwise in communication with the scheduling queue 140 to receive continual updates when requests are added to and/or removed from the scheduling queue 140.

Figure 2:
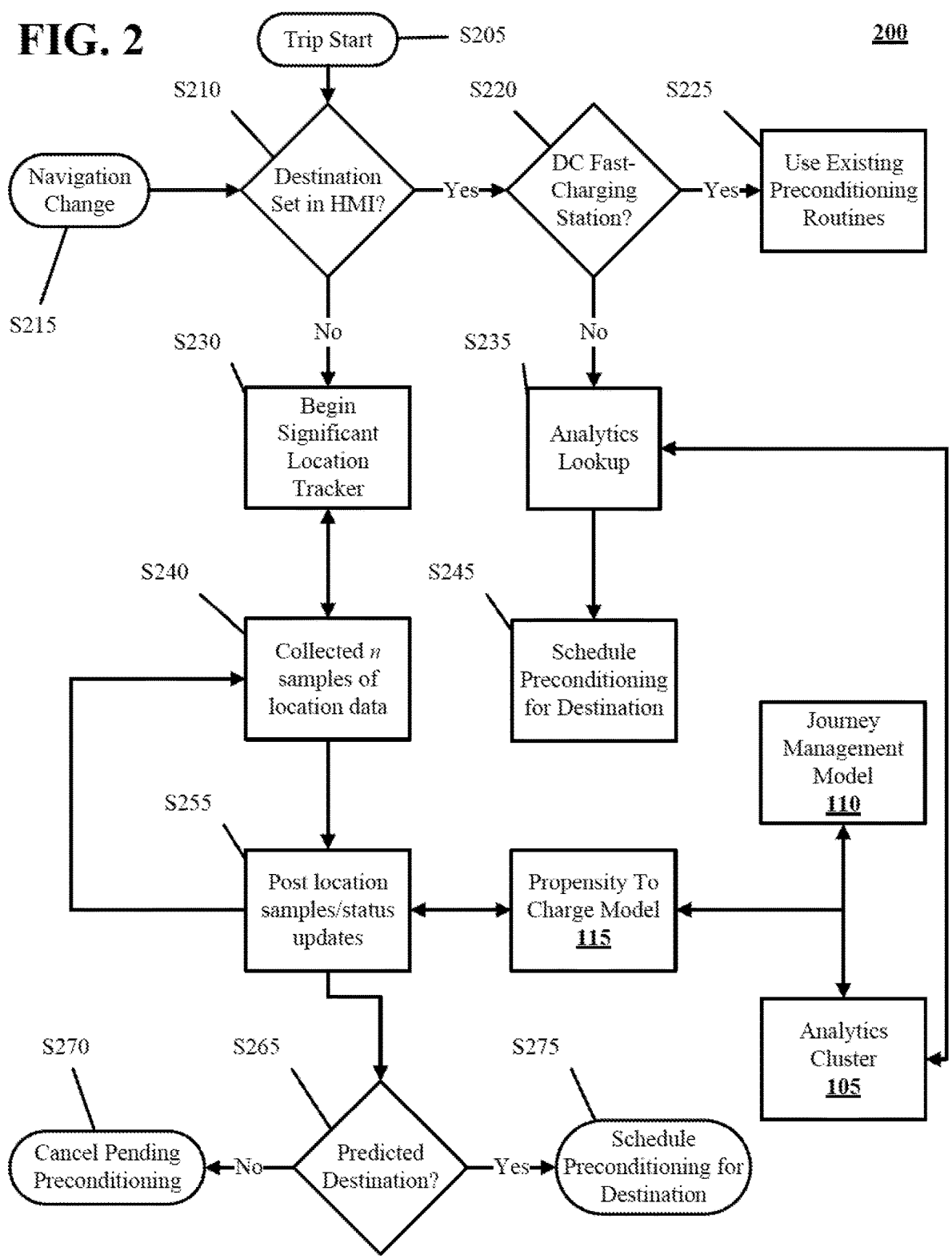
FIG. 2 shows an example flow of a process that may be carried out by a trip change monitor in accordance with an embodiment of the present subject matter.

FIG. 2 illustrates a flow of a process 200 that may be executed by the trip change monitor 135. The trip change monitor 135 may begin executing process 200 based on the occurrence of one or more triggers defined by S205 and S215, which may lead to scheduling preconditioning of the vehicle battery pack 160. In addition to S205 and S215, process 200 may be triggered based on the battery pack SoC being reduced to a predetermined capacity, such as 70%, 60%, 50%, and the like. Trip change monitor 135 may detect the start of a trip of the vehicle 130 in S205. The detection of the trip start in S205 may occur regardless of the status of the navigation system of the vehicle 130. On the other hand, in S210 the navigation system may be checked to determine whether a destination has been set by the vehicle driver, another user, or via another software application that operates within the vehicle 130 operating system environment or externally communicates with the vehicle 130, such as a smartphone software application. In one example, the vehicle navigation system destination may be set and/or changed via the HMI. The check that may occur in S205 may also occur in response to a change in the navigation destination in S215. If a change has occurred in the navigation using the HMI, the process 200 may proceed to S220 where it may be determined whether the navigation destination has been set to a DC fast charging station. If so, the process 200 may advance to S225 to use already-existing preconditioning routines and to determine whether and when to precondition the vehicle battery pack 160 in anticipation of DC fast charging.

If the destination has not been set to a DC fast charging station, process 200 may proceed to S235 from S220, where it may utilize the analytics cluster 105 to determine whether the vehicle may be connected to a DC fast charging station and should schedule preconditioning in S245. The trip change monitor 135 may provide, for example, the trip destination set via the HMI in S210, as well as a heuristic radius data, to the analytics cluster 105. The analytics cluster 105 may process the trip destination and heuristic radius data to assess whether the trip destination has a DC fast charging station and whether it will be accessible to the vehicle 130. This assessment may be based on data aggregated from a fleet of vehicles that have recently charged or attempted to charge at the trip destination. In one example, only publicly accessible DC fast charging stations may be considered by the analytics cluster 105 in assessing whether the trip destination has an available DC fast charging station. In another example, the user may have access to private or restricted DC fast charging stations as a result of status as a customer of a retail establishment, a member of a club, an employee of a corporation, or the like.

The analytics cluster 105 may also determine the user's status, whether a reservation has been made at a fast charging station, whether a fast charging station is available, and/or whether the user is a member of a fast charging station network to compile a list of available DC fast charging stations. This list may be returned to the process 200, which may predict whether preconditioning should be scheduled in S245 upon arrival at the trip destination. The list returned to the process 200 may be based on a selection of DC fast charging stations from the real-time, up-to-the-second accurate records of all known DC fast charging stations previously discussed. The list may be selected by applying one or more filters based on any of the metadata elements shown in Table 1 in addition to the trip destination and the heuristic radius sent from the trip change monitor 135. Based on the list, the trip change monitor 135 may determine that DC fast charging may be likely and may schedule preconditioning of the battery pack 160 in S245.

The trip change monitor 135 schedules preconditioning by adding a request to the scheduling queue 140. The scheduling queue 140 may be implemented in a variety of data structures and may facilitate communication between the trip change monitor 135, the preconditioning scheduler 145, and the battery management system 155. The battery management system 155 may perform such functions as, monitoring battery cell health of the battery pack 160, controlling the rate of charging both during recuperative braking and while connected to a charging station, battery pack temperature monitoring, and directly controlling the preconditioning process. The battery management system 155 may be controlled directly by the preconditioning scheduler 145 and may be otherwise isolated from components other than the battery pack 160. For instance, the preconditioning scheduler 145 may issue commands to the battery management system 155 to start or stop preconditioning the battery pack 160 based on the contents of the scheduling queue 140. In an embodiment, one or more of the trip change monitor 135, the preconditioning scheduler 145, and the battery management system 155 may not communicate with one another directly; rather, communication may occur only through the scheduling queue 140. For instance, one component may write a request to the scheduling queue 140 and another component may read the request from the scheduling queue 140. Alternatively or in addition, one component may "publish" to the scheduling queue 140 while other components are "subscribed," to the scheduling queue 140 to receive continual updates as new requests are added and/or completed. Each request in the scheduling queue 140 may represent a pending transaction and may be described according to the schema listed in Table 2 below.

TABLE 2

| Attribute | Type | Comment |
| --- | --- | --- |
| req_id | GUID/hex UUID | Identifier used to track the request |
| Station_lat | Float 32 | Latitude in WGS84 |
| Req_start_ | Long int | Epoch Time when the |

TABLE 2-continued

| Attribute | Type | Comment |
| --- | --- | --- |
| unix_time | | request was ordered |
| Req_update_unix_time | Long int | Epoch time when the request was updated (if the user changed the route or other metadata was updated AFTER insertion of event) |
| Command | Enumeration | Can take the form: Abort or Precondition |
| Target_unix_time | Long int | Time to target for preconditioning to be complete (ETA). |
| Metadata | JSON | JSON Dictionary sub child |
| metadata.route | List of Float 32 Tuples | A list of waypoints forming the route to the destination |
| Metadata.charger_peak_kW | Short int | Peak kW of charging infrastructure |

Returning to the discussion of S235 in FIG. 2, the list returned from the cloud 165 may be empty and/or the analytics cluster 105 may determine that there are no available DC fast charging stations located at the trip destination or within the heuristic radius of the trip destination. In this case, DC fast charging of the vehicle 130 may be unlikely, and so the trip change monitor 135 may simply cancel any already-scheduled preconditioning and/or abort process 200.

Where a trip destination may not be set in the HMI of the vehicle 130, the process 200 continues to significant location tracker S230, which may begin collecting location data samples during the trip S240. The location data samples, status updates, events, and the like may be periodically transmitted to the cloud 165 in S255. Specifically, the predictions of the journey management model 110 and propensity to charge models 115 may be subscribed to by the HMI of the vehicle 130. The cloud 165 may publish its predictions when it deems necessary and based on whether sufficient data has been provided from the vehicle 130 in order to do so. By merely subscribing to the predictions of the cloud rather than requesting predictions, coupling between the vehicle 130 and cloud 165 may be reduced. As previously described, the journey management model 110 and propensity to charge model 115 may utilize the location data samples of a live trip to predict the destination of the vehicle 130, a confidence score, and the propensity of the user to DC fast charge the battery pack 160 of the vehicle 130 if the predicted destination is reached. The predicted destination, propensity to DC fast charge, and availability of DC fast charging stations may be interrelated and/or interdependent. For example, a predicted destination, even if correct, when coupled with a correct prediction of the user's propensity to purchase DC fast charging under the current conditions may be in error if the analytics cluster 105 charging station dataset indicates that no DC fast charging stations are currently available because they are occupied, out of service, or the like. Similarly, a user's propensity to charge may be at least partially dependent on the predicted destination. Accordingly, the resulting data provided from each of the analytics cluster 150, journey management model 110, and propensity to charge model 115 may be compared and cross-examined prior to returning the predictions to process 200 of the trip change monitor 135. Alternatively, or in addition, the predictions of the journey management model 110 and propensity to charge model 115 may each be provided to process 200 along with the corresponding charging station availability data from the analytics cluster 105. Process 200 may then perform an analysis that compares and cross examines the predictions and availability data. In S265, process 200 may evaluate whether a predicted destination has been determined with a sufficient confidence score and with an availability of at least one DC fast charging station to warrant scheduling preconditioning of the battery pack 160 for the predicted destination. Other considerations that may occur in S265 include whether the DC fast charging station is public, whether DC fast charging is possible and/or operable, and whether the DC fast charging station includes a charging socket that is compatible with the vehicle 130. In an embodiment, the confidence score may be compared with a threshold value. If the threshold is met, process 200 may either schedule preconditioning in S275 or may cancel the preconditioning step in S270. Even if the preconditioning may be currently canceled in S270, if the trip remains ongoing, process 200 may continue to receive new predictions from the cloud 165 in accordance with the vehicle's subscription as additional user data, trip status data, and location data may be collected. Subsequent predictions may prompt process 200 to revisit scheduling the preconditioning. As previously discussed, it may be important that process 200 cancels the preconditioning where a predicted destination cannot be determined with a requisite confidence score to prevent the temperature of the battery pack 160 from being unnecessarily elevated. Where preconditioning may actually be scheduled according to S275, but the user of the vehicle 130 does not subsequently connect the vehicle 130 to a DC fast charging station, the trip change monitor 135 may record the incorrect prediction and provide the associated data to the cloud 165 to assist with retraining the machine learning models. The associated data may be, for example, a correlation identifier, the predicted charging location, the actual destination at which the vehicle 130 parked, the duration of parking, the SoC of the battery pack 160 at the end of the trip, and the actual distance traveled. The correlation identifier may allow for tracking an incorrect preconditioning prediction and the associated ground truth events in a single transaction.

Figure 3:
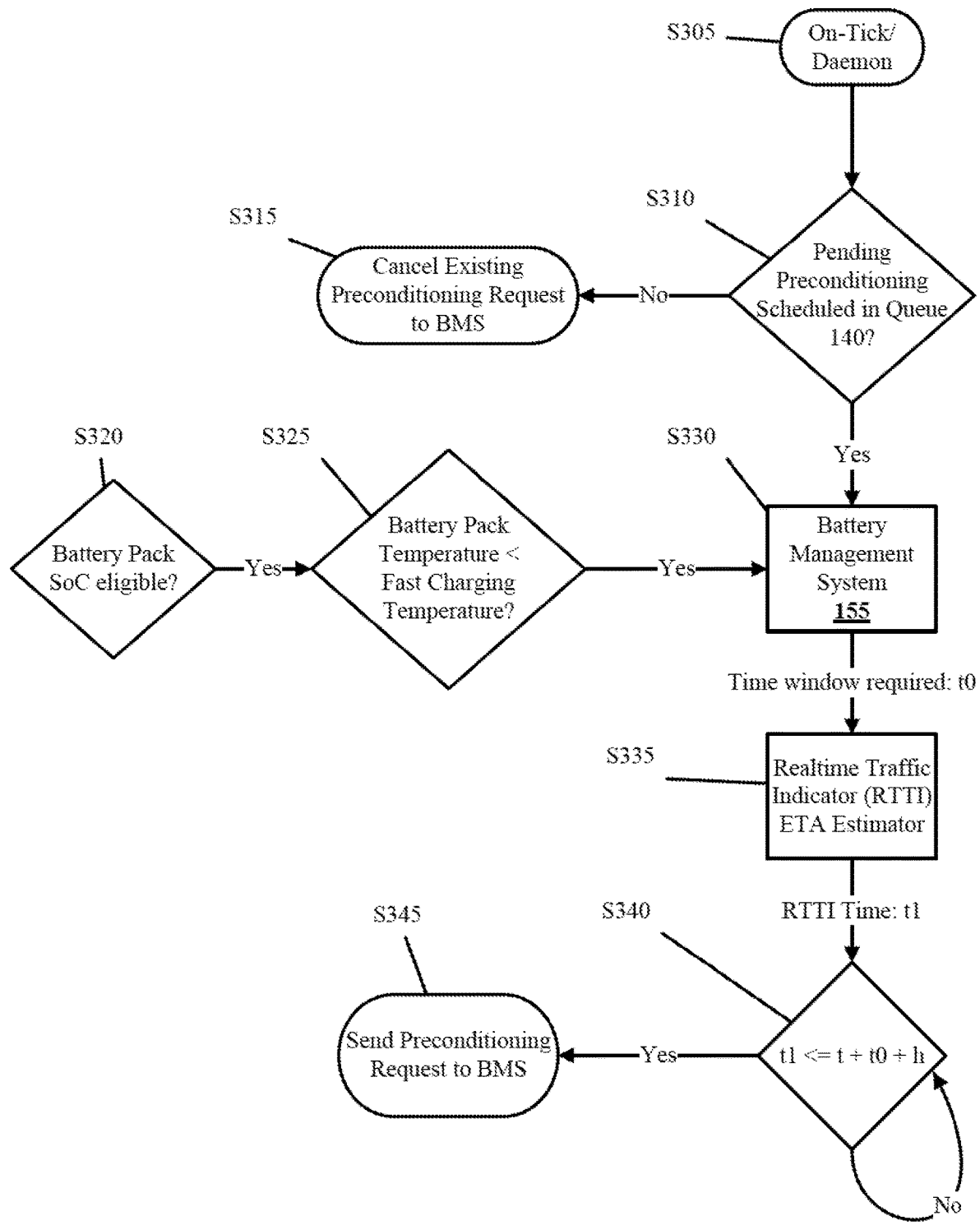
FIG. 3 shows an example flow of a process that may be carried out by a preconditioning scheduler in accordance with an embodiment of the present subject matter.

FIG. 3 shows a process 300 that may be performed by a preconditioning scheduler 145, which may be implemented by a daemon as previously discussed. The preconditioning scheduler 145 may execute in parallel, and/or in another thread with the trip change monitor 135 within the operating system environment of the vehicle 130. The preconditioning scheduler 145 may be responsible for listening for requests for preconditioning from the trip change monitor 135, which have been added to the scheduling queue 140, and to schedule preconditioning at an appropriate time. The preconditioning scheduler 145 may have exclusive control of directing the battery management system 155 and may be communicably isolated from all other components except for the battery management system 155 and the scheduling queue 140. In this way, the preconditioning scheduler 145 may be less vulnerable to unauthorized access, for example. The process 300 may begin in S305 whenever the preconditioning scheduler 145 may be called, and/or at regular or irregular intervals and whenever there is a change in the state of the scheduling queue 140. In S310, the process 300 may determine whether a pending preconditioning request has been scheduled or unscheduled by the trip change monitor 135 by referring to the scheduling queue 140. If no request is pending in the scheduling queue 140, any pending or currently-executing preconditioning request to the battery management system 155 may be canceled in S315 to avoid heating the battery pack 160 unnecessarily. If a pending preconditioning is currently scheduled, process 300 may advance to S330, where the battery management system 155 may further confirm that the state of charge (SoC) of the battery pack 160 is eligible in S320. If so, in S325 the process 300 may determine whether the current temperature of the battery pack 160 is less than the desired temperature for DC fast charging. If so, the process 300 may identify a time window "t0" needed to increase the temperature of the battery pack 160 to the desired DC fast charging temperature. In S335, a real-time traffic information (RTTI) application programming interface (API) may be invoked to predict an estimated time of arrival (ETA) or a travel duration to arrive at the trip destination. The RTTI may receive real-time traffic data via gateway 125 or another secure network and may allow for estimating a length of time that travel along a route to the trip destination will take. This ETA may be designated as "t1," as shown in FIG. 3. In S340, process 300 may determine whether the ETA (t1) is less than or equal to the current time "t" plus the time window "t0" plus a time window heuristic "h." The time window heuristic "h" may be a time window that can compensate for errors, such as battery-specific offsets, calibration errors, and the like. In an example, assuming the call to the RTTI reveals that the ETA (t1) is 4:05 p.m., the time window (t0) is 7 minutes, and the time window heuristic (h) is 1 minute, S340 may begin preconditioning when the current time is 3:57 p.m. This can be seen by applying the formula shown in S340 and solving for the current time "t" such that preconditioning begins when 4:05 p.m. <=(current time "t")+7+1. When this condition is met, the process 300 may proceed to S345 where a precondition request may be sent to the battery management system 155.

In situations in which the systems discussed here collect personal information about users, or may make use of personal information, the users may be provided with an opportunity to control whether programs or features collect user information (e.g., location data, driving behaviors, destinations, charging behaviors, and other user preferences), or to control whether and/or how to receive content from the content server that may be more relevant to the user. In addition, certain data may be treated in one or more ways before it is stored or used, so that personally identifiable information is removed or limited. For example, a user's identity may be treated so that no personally identifiable information can be determined for the user, or a user's geographic location may be generalized where location information is obtained (such as to a city, ZIP code, or state level), so that a particular location of a user cannot be determined. Conversely, where the user is interacting with known friends or acquaintances, some or all personal information may be made selectively accessible by the other users. Thus, the user may have control over how information is collected about the user and used by a system as disclosed herein.

Figure 4:
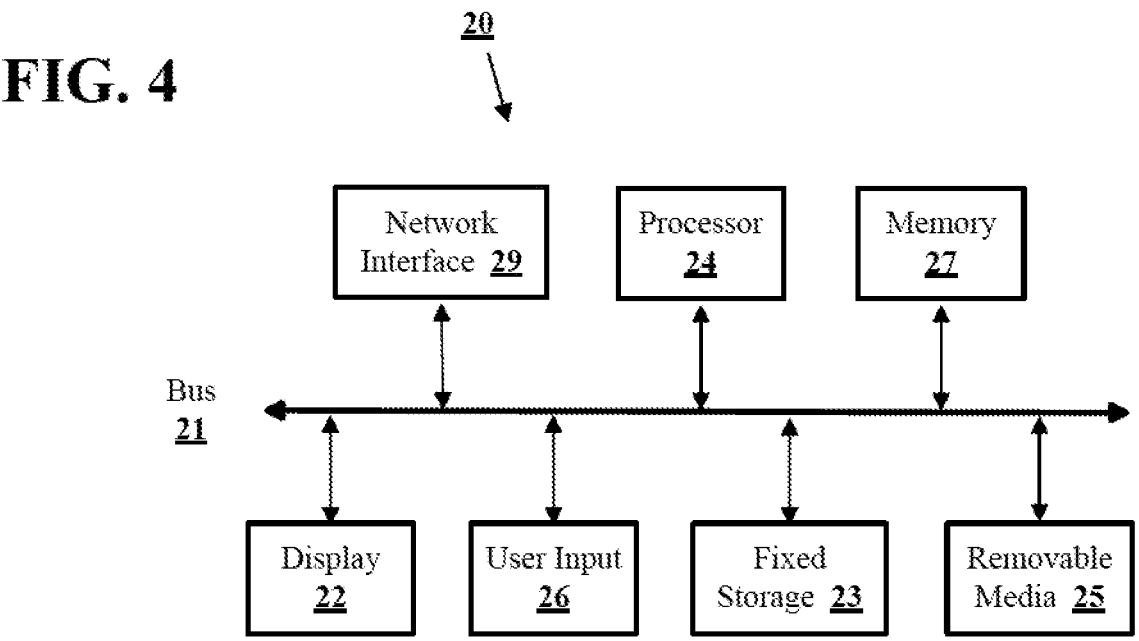
FIG. 4 shows a computing device according to an embodiment of the disclosed subject matter.

Embodiments of the presently disclosed subject matter may be implemented in and used with a variety of component and network architectures. FIG. 4 is an example computing device 20 suitable for implementing embodiments of the presently disclosed subject matter. The device 20 may be, for example, a desktop or laptop computer, vehicle-based computer or electronic control unit, console, server, set-top box, or a mobile computing device such as a smart phone, tablet, or the like. The device 20 may include a bus 21 which interconnects major components of the computing device 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field communication, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
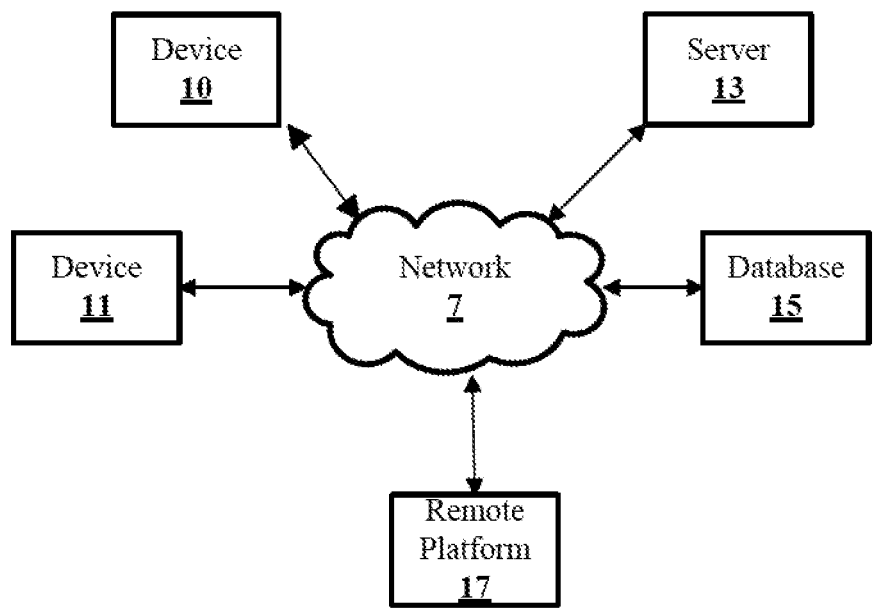
FIG. 5 shows a network configuration according to an embodiment of the disclosed subject matter.

FIG. 5 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 6:
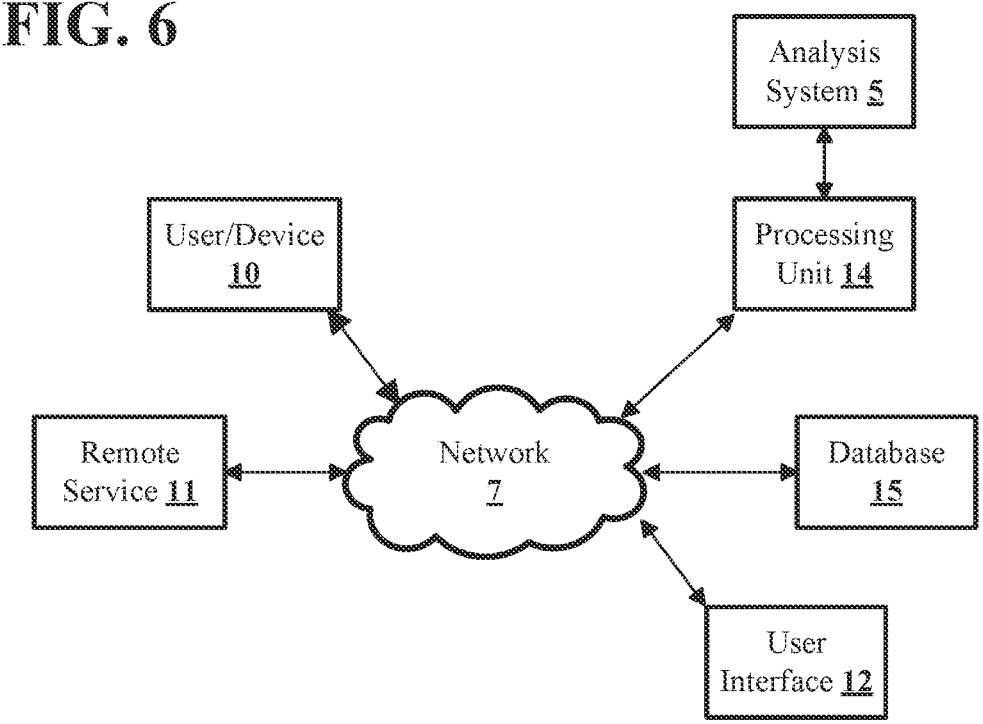
FIG. 6 shows an example network and system configuration according to an embodiment of the disclosed subject matter.

FIG. 6 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface 12. In some cases, the devices 10, 11 may communicate with a user-facing interface 12, which may provide access to one or more other systems such as a database 15, a processing unit 14, or the like. For example, the user interface 12 may be a user-accessible web page that provides data from one or more other computer systems. The user interface 12 may provide different interfaces to different clients, such as where a human-readable web page is provided to a web browser client on a user device 10, and a computer-readable API or other interface is provided to a remote service client 11.

The user interface 12, database 15, and/or processing units 14 may be part of an integral system or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 12. In some arrangements, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk, or any other device capable of storing electronic information. The memory may store instructions adapted to be executed by the processor to perform the techniques according to embodiments of the disclosed subject matter.

The present subject matter may improve the ability of computing systems connected to electric vehicles to predict when preconditioning the associated battery pack should be performed in anticipation of DC fast charging. The embodiments disclosed herein may allow for the computing system to predict the user's destination and whether the user will be connecting the electric vehicle to a DC fast charging station. The present subject matter may facilitate these predictions without necessarily requesting this information from the user explicitly, thus improving the convenience of the computing system. The embodiments disclosed herein may leverage past historical data for a user as well as new data being generated while the trip may be ongoing. This data may be provided to one or more machine learning models, which may be periodically retrained to improve accuracy of the predictions. As the predictions may be generated continuously as more data may be collected during a trip, the accuracy of the predictions may be further improved. By generating an accurate prediction for when preconditioning of the electrical vehicle battery pack should begin, the time needed to recharge the battery pack may be reduced, thus improving the user experience.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for preconditioning a battery pack of a vehicle to support fast charging, comprising:
    a processor;
    a memory in communication with the processor, the memory storing a plurality of instructions executable by the processor to cause the system to:
        detect a trigger that indicates the vehicle will be traveling or the battery pack of the vehicle has been reduced to a predetermined capacity;
        collect a plurality of samples of real-time current location data of the vehicle;
        convey the plurality of samples to a journey management machine learning model;
        predict, using the journey management machine learning model, a plurality of destinations of the vehicle based on the plurality of samples;
        determine, using a propensity to charge machine learning model, a propensity of a user to fast charge the vehicle based on the predicted plurality of destinations and one or more of:
            the user's distance traveled in the vehicle since a last known charging event,
            whether other users are present in the vehicle with the user, or
            the user's historic fast charging behavior;
        receive, via an analytics cluster, charging station availability data that indicates whether one or more charging stations are available; and
        schedule preconditioning of the battery pack based on determining:
            a charging station is available based on the charging station availability data for one of the plurality of predicted destinations, and the predicted user's propensity to fast charge the vehicle at the one of the plurality of predicted destinations.

2. The system of claim 1, further comprising instructions executable by the processor to cause the system to:
cancel a scheduled or currently-executing preconditioning of the battery pack in response to determining, based on the charging station availability data, that no available charging stations exist for the one of the plurality of predicted destinations.

3. The system of claim 1, wherein
the preconditioning of the battery pack of the vehicle deliberately increases the temperature of the battery pack.

4. The system of claim 1, further comprising instructions executable by the processor to cause the system to:
determine an estimated arrival time that the vehicle will arrive at the predicted destination; and
determine a preconditioning time prior to the estimated arrival time when the vehicle will begin preconditioning the battery pack.

5. The system of claim 1, further comprising instructions executable by the processor to cause the system to:
determine a time window needed to increase a temperature of the battery pack to a target preconditioned temperature.

6. The system of claim 5, further comprising instructions executable by the processor to cause the system to:
compare the time window with an estimated arrival time that the vehicle will arrive at the predicted destination; and
start to precondition the battery pack based on the comparison.

7. The system of claim 1, wherein
the charging station availability data received via the analytics cluster is based on aggregate data published by a plurality of other vehicles that attempted to charge at the predicted destination.

8. The system of claim 1, wherein
the instructions executable by the processor to cause the system to predict the destination of the vehicle are based on a determination that no destination has been set in a navigation function of the vehicle.

9. The system of claim 1, further comprising instructions executable by the processor to cause the system to:
cancel a scheduled or currently-executing preconditioning of the battery pack based on a confidence score generated by the journey management machine learning model not meeting a threshold.

10. The system of claim 1, wherein the determined propensity of the user to fast charge the vehicle is further based on at least one of:
the predicted location;
a total distance driven on a day;
a price of recharging at a charging station of the predicted location;
scheduled events and appointments stored within a personal computing device of the user;
a predicted driver of the vehicle;
a remaining state of charge of the battery pack; or
whether amenities are available near a charging station of the predicted location.

11. A method of preconditioning a battery pack of a vehicle to support fast charging, comprising:
detecting a trigger that indicates the vehicle will be traveling or the battery pack of the vehicle has been reduced to a predetermined capacity;
collecting a plurality of samples of real-time current location data of the vehicle;
conveying the plurality of samples to a journey management machine learning model;
predicting, using the journey management machine learning model, a plurality of destinations of the vehicle based on the plurality of samples;
determining, using a propensity to charge machine learning model, a propensity of a user to fast charge the vehicle based on the predicted plurality of destinations and one or more of:
the user's distance traveled in the vehicle since a last known charging event,
whether other users are present in the vehicle with the user, or
the user's historic fast charging behavior;
receiving, via an analytics cluster, charging station availability data that indicates whether one or more charging stations are available; and
scheduling preconditioning of the battery pack based on determining:
a charging station is available based on the charging station availability data for one of the plurality of predicted destinations, and
the predicted user's propensity to fast charge the vehicle at the one of the plurality of predicted destinations.

12. The method of claim 11, further comprising:
canceling a scheduled or currently-executing preconditioning of the battery pack in response to determining, based on the charging station availability data, that no available charging stations exist for the one of the plurality of predicted destinations.

13. The method of claim 11, wherein
the preconditioning of the battery pack of the vehicle deliberately increases the temperature of the battery pack.

14. The method of claim 11, further comprising:
determining an estimated arrival time that the vehicle will arrive at the predicted destination; and
determining a preconditioning time prior to the estimated arrival time when the vehicle will begin preconditioning the battery pack.

15. The method of claim 11, further comprising:
determining a time window needed to increase a temperature of the battery pack to a target preconditioned temperature.

16. The method of claim 15, further comprising:
comparing the time window with an estimated arrival time that the vehicle will arrive at the predicted destination; and
starting to precondition the battery pack based on the comparison.

17. The method of claim 11, wherein
the charging station availability data received via the analytics cluster is based on aggregate data published by a plurality of other vehicles that attempted to charge at the predicted destination.

18. The method of claim 11, wherein
the predicting of the destination of the vehicle is based on determining that no destination has been set in a navigation function of the vehicle.

19. The method of claim 11, further comprising:
canceling a scheduled or currently-executing preconditioning of the battery pack based on a confidence score generated by the journey management machine learning model not meeting a threshold.

20. The method of claim 11, wherein the determined propensity of the user to fast charge the vehicle is further based on at least one of:
- the predicted location;
- a total distance driven on a day;
- a price of recharging at a charging station of the predicted location;
- scheduled events and appointments stored within a personal computing device of the user;
- a predicted driver of the vehicle;
- a remaining state of charge of the battery pack; or
- whether amenities are available near a charging station of the predicted location.

\* \* \* \* \*